United States Patent [19]
Roth

[11] 4,080,857
[45] Mar. 28, 1978

[54] DEVICE FOR CUTTING PIECES OF PREDETERMINED LENGTH FROM ENDLESS, STRAND-FORM MATERIAL

[76] Inventor: Paul Roth, Route de Giez, 1411, Les Tuileries-de-Grandson, Switzerland

[21] Appl. No.: 751,594

[22] Filed: Dec. 17, 1976

[30] Foreign Application Priority Data

Dec. 19, 1975 Switzerland .................. 16479/75

[51] Int. Cl.² ............................................. B26D 5/24
[52] U.S. Cl. ........................................ 83/241; 83/261
[58] Field of Search ................. 83/241, 261; 226/154, 226/155

[56] References Cited

U.S. PATENT DOCUMENTS

| | | | |
|---|---|---|---|
| 1,284,289 | 11/1918 | Foote | 226/155 X |
| 1,597,754 | 8/1926 | Sevigne et al. | 226/154 X |
| 2,826,251 | 3/1958 | Hopkins | 83/261 |
| 3,009,617 | 11/1961 | Brown | 226/155 |
| 3,176,563 | 4/1965 | Sharpe | 83/261 X |
| 3,203,608 | 8/1965 | Mogolis | 226/155 X |
| 3,465,629 | 9/1969 | Krueger | 83/261 X |

*Primary Examiner*—J. M. Meister

*Attorney, Agent, or Firm*—Brady, O'Boyle & Gates

[57] ABSTRACT

A driven disk having a units of length scale about the circumference is mounted on an axis parallel with the axis of a freely rotatable pressure roller mounted on a spring biased lever which in one position urges the pressure roller toward the disk such that strand material can be engaged by cooperating circumferential grooves in the disk and roller and advanced on rotation of the disk. A guide for the strand material, tangential to the disk, is disposed on opposite sides of the pressure roller with the output end forming a counterblade for a cut-off blade on the end of the lever which also has a cam surface which cooperates with a roller on the underside of the disk for moving the lever and pressure roller away from the disk and the cut-off blade to the strand material cut-off position. At the beginning of the strand advancing cycle a pawl cooperating with the lever holds the pressure roller out of contact with the disk until an adjustable pointer on the disk length scale moves into contact with and removes the pawl from a position blocking the movement of the pressure roller and strand material into contact with the disk.

12 Claims, 2 Drawing Figures

DEVICE FOR CUTTING PIECES OF PREDETERMINED LENGTH FROM ENDLESS, STRAND-FORM MATERIAL

The present invention relates to a device for cutting pieces of predetermined length from an endless, strand-form material such as wire or cord.

The object of the invention is to cut the pieces with a simple device which is easy to operate and which can be adjusted to the different lengths of the cut pieces.

This is obtained in the case of the device according to the invention by two rotary elements having parallel axes. One of the rotary elements is driven and the other is mounted for free rotation on a movable holder. The holder pushes the freely rotatable rotary element towards the driven rotary element in a position serving to forcibly advance the material between the two rotary elements and it stops in another position in which it is spaced apart from the driven rotary element. The device also comprises a material guide which guides the material on both sides of the gap between the rotary elements in such a way that it does not come into contact with the driven rotary element in the other position of the holder. A device is also provided which is forcibly actuated simultaneously with the driven rotary element and which moves the holder into a first position in the first rotational position of the driven rotary element and into a second position in the second rotational position of the driven rotary element, one of these rotational positions being adjustable for the purpose of adjusting the predetermined length of the piece of material. There is also provided according to the invention a cutting device for the material which is forcibly actuated with the driven rotary element in the other position of the holder.

An embodiment of a device for cutting pieces of wire of a predetermined length will be described hereinafter with reference to the accompanying drawings, in which.

Figure 1:
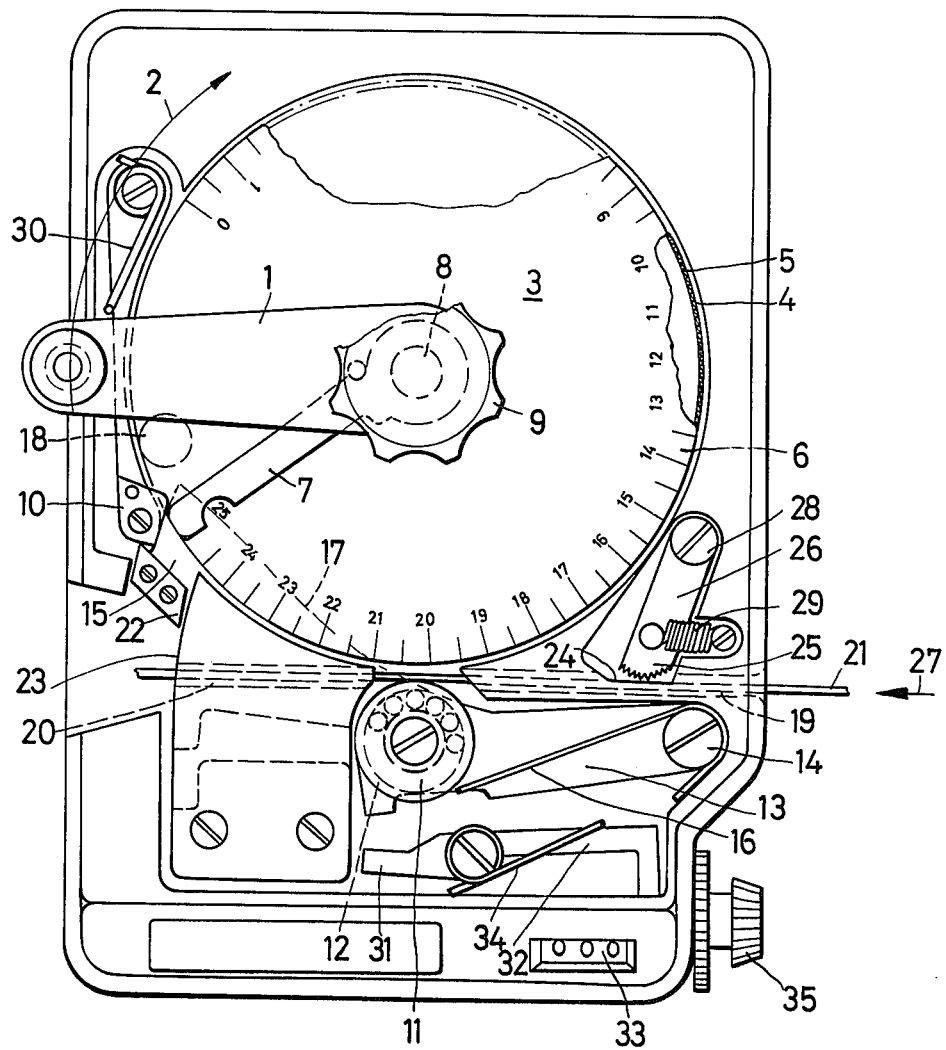
FIG. 1 is a plan view of the device.

The device represented comprises a gyroscope disk 3 designed to be operated manually in the direction of the arrow 2 by means of a crank 1. The gyroscope disk 3 comprises a gripping circumferential groove 4. The gripping property is provided by a saw-tooth profile 5, the steep sides of which lead in the direction 2. The upper side of the disk 3 comprises a curved scale 6 which extends over an angle of approximately 290° and which is divided into length units of the disk circumference. An indicator/pointer 7 which cooperates with the scale 6 is rotatable about the axis 8 of the disk 3 and is designed to be attached to the disk 3 by means of an attachment screw comprising a handle 9. The outer end of the pointer 7 is used to release a pawl 10, as will be described hereinafter and as shown in FIG. 1.

A pressure roller 11 is equipped with a circumferential groove 12 and is mounted for free rotation on a one armed lever 13 between its axis 14 and the free end 15 with the groove 12 forming the mirror image of the groove 4 of the disk 3. The lever 13 is influenced by a spring 16 which serves to press the pressure roller 11 against the edge of the disk 3. The lever 13 is disposed lower than the disk 3 and a part of its edge facing towards the axis 8 of the disk 3 forms a cam 17 which extends to the free lever end 15. Together with a roller 18 which is mounted for free rotation on the underside of the disk 3, close to the edge of the same, this cam 17 forms a cam gear. The lever 13 is pivoted against the force of the spring 16 by means of this gear throughout a portion of one rotation of the disk 3 (in the direction of the arrow 2) extending over approximately 70°, so as to remove the pressure roller 11 from the disk 3.

A wire guide disposed tangentially with respect to the disk 3 consists of a guide channel 19 leading to the intermediate space between the disk 3 and the pressure roller 11 and a channel 20 leading away from this intermediate chamber. The channels 19 and 20 guide the wire 21 close by the edge of the disk 3 in such a way that the wire 21 is only carried along by the disk 3 when the pressure roller 11 presses on the same. The distance between the channels 19 and 20 is so regulated that when the pressure roller 11 is in the raised position the wire 21 does not contact the disk 3. However, when the pressure roller 11 is moved into the pressing position, the wire 21 can be gently pressed towards the disk 3 until it is carried along by the disk 3.

A cutting blade 22 is disposed on the free end of the lever 13. When the lever 13 is pivoted, the cutting blade slides at the output end of the channel 20 such that the latter forms the counter-blade 23.

The guide channel 19 has a lateral opening 24 in which a gripping end 25 of a locking member of a ratchet brake engages. The locking member 26 only releases the wire 21 in its advancement direction 27 but blocks it in the opposite direction. Consequently, viewed in the advancement direction 27, the gripping end 25 follows at some distance from the axis of rotation 28 of the member 26. A tension spring 29 ensures that the gripping end 25 rests on the wire 21.

The pawl 10 mentioned above in connection with the pointer 7, is biased by a spring 30. The pawl 10 engages on the lever 13 under the influence of the spring 30 when the roller 18, cooperating with the cam 17, has pushed back the lever 13, against the force of the spring 16, to such an extent that the pressure roller 11 no longer presses the wire 21 against the disk and prevents the pressure roller 11 from moving closer to the disk 3 until the pawl 10 is released. In this engaged state (FIG. 1) the pawl 10 projects into the path of movement of the outer end of the pointer 7 such that it is released by the latter whereupon the lever 13 presses the pressure roller 11 towards the disk 3(FIG. 2).

Figure 2:
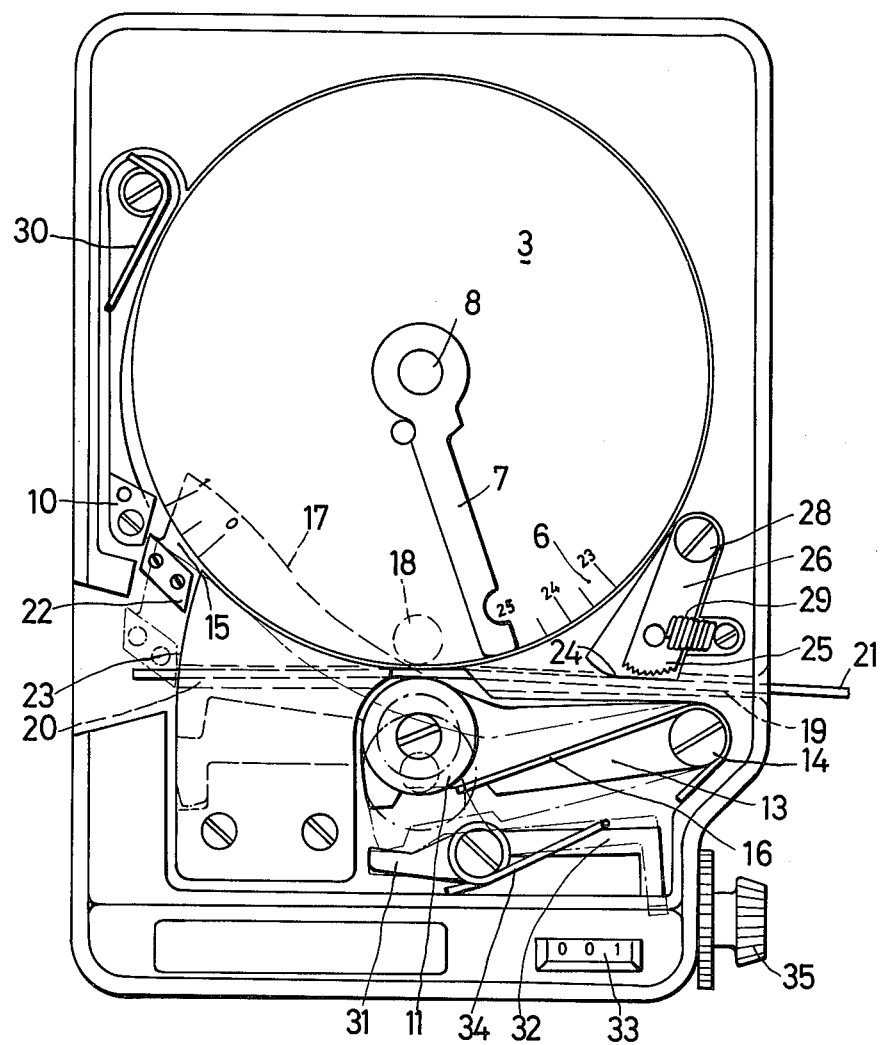
FIG. 2 is a view corresponding to the one shown in FIG. 1 with the movable parts in a different position. The drive crank has been removed.

In the position of the lever 13 represented by the perforated lines in FIG. 2, in which the roller 18 presses the cam 17 furthest away from the axis of the disk 3 and the blade 22 has cut the wire 21, the lever 13 actuates one end 31 of a two-armed lever while its other end 32 advances a counter 33 (not shown in greater detail) by one step. The lever 31/32 is biased by a spring 34. 35 designates a knob, by means of which the counter 33 can be set at zero.

To ensure correct operation of the device over an extended thickness range of the wire, the axis of the pressure roller 11 can be adjustably secured on the lever 13 in such a way that in the particular lever position it reliably presses the wire against the disk 3 resp., maintains correct spacing with respect to the wire.

Pieces of wire 21 of predetermined length can be cut by means of the device according to the invention in the following manner:

The predetermined length which, in the embodiment shown, is 25 units, is adjusted/engaged on the scale 6 by means of the pointer 7 and the latter is secured on the disk 3 by means of the handle 9. The disk 3 is rotated by means of the crank 1 into the position in which the roller 18 has just left the cam (see FIG. 1). The wire 21 is inserted in the wire guide 19/20 and, to cut the first piece, it is inserted until its end is flush with the counterblade 23, as is the case after each cutting operation. In the above-mentioned position of the disk 3 the blade 22 strikes against the pawl 10 and the latter holds the lever 13 against the force of the spring 16 in a position in which the pressure roller 11 does not engage on the wire 21. When, during rotation of the crank 1 in the direction of the arrow 2, the outer end of the indicator/pointer 7 reaches the pawl 10, the latter releases the lever 13 which follows the force of the spring 16 until the wire 21 is gripped between the pressure roller 11 and the disk 3. As the disk 3 continues its rotation (2) it advances the wire 21 until the roller 18 engages on the cam 17 and pivots back the lever. At this point the pressure roller 11 is removed and the blade cuts the wire piece projecting from the channel 20 in the position of the lever 13 and the blade 22 represented by the perforated lines in FIG. 2. Thereafter, the pawl 10 engages again in its position shown in FIG. 1 in which it holds the lever 13 in the position shown in FIG. 1 when the roller 18 has run down from the end of the cam 17. When the piece of wire is cut, the counter 33 is advanced by a step, thereby counting the cut pieces of wire. The starting position of the movable parts and of the wire in the device is then re-established.

As is apparent, during each rotation of the crank, one piece of wire is cut off. The wire is only carried along and thus advanced over a portion of the complete rotation of the disk 3. The part of the circumference of the disk 3 corresponding to this portion of a rotation corresponds to the length of the cut piece of wire. It is determined, on the one hand, by the position of the disk, dependent on the adjustment of the pointer 7, in which the pointer 7 causes the pressure roller 11 to be pressed through the release of the pawl 10, and, on the other hand, by the position of the disk 3 in which the roller 18 moves over the cam 17, thus removing the pressure roller 11. The length of the cut piece of wire can thus be selected by adjusting the pointer.

To cut pieces of strand-form material which are longer than the circumference of the disk, the afore-described device can be so designed that the material is only cut during the last of a number of rotations of the crank. The length of the cut piece will then be the length engaged on the scale multiplied by the number of rotations.

Accordingly, the device can be provided with a counter on which the number of rotations can be adjusted. The device can also comprise a movable material guide disposed between the intermediate space between the disk and the pressure roller and between the blade and the counterblade, the movement of this movable material guide being controlled by the counter in such a way that, up to the penultimate rotation of the regulated number of rotations, it guides the material outside of the intermediate space between the blade and the counterblade during each cutting movement of the blade such that the material is only cut thereafter, i.e., during the last rotation of the regulated number of rotations. The movable material guide advantageously consists of a sleeve which is pivotably mounted by its end remote from the blade and counterblade and which is operated by a mechanism driven by the disk and controlled by the counter.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

What is claimed is:

1. A device for cutting pieces of predetermined length from an endless wire and similar strand and strip material, comprising a circular disk (3) and a roller (11), between which disk (3) and roller (11) the wire (21) is fed, means (1) for rotating said disk (3), a lever member (13) mounting said roller (11) for free rotation and being under the influence of a spring member (16) for pressing said roller (11) towards the periphery of said disk (3) and thereby urging the wire (21) to be fed against the periphery of said disk (3) and forcibly advance between the peripheries of said disk (3) and said roller (11) in a wire feeding direction, setting means (7) secured in an adjustable position on said disk (3) for setting said predetermined length, a gear (17,18) which is forcibly driven simultaneously with the disk (3) and which acts on the lever member (13) causing it to raise the roller (11) in opposition to said spring member (16) during a portion of one rotation of said disk (3), wire guide means (19,20) disposed tangentially with respect to disk (3) for guiding the wire (21) on both sides of the space between said disk (3) and said roller (11) in such a way that the wire (21) is only carried along by said disk (3) when said roller (11) is pressed towards the periphery of said disk (3), cutting means (22,23) at the output of said wire guide means (19,20) and being actuated simultaneously with said disk (3) in the raised position (FIG. 1) of said roller (11) for cutting said pieces of predetermined length from said wire (21) and a spring-biased pawl (10) which holds said lever member (13) in the raised position (FIG. 1) of said roller (11) against the force of said spring member (16) and, in the course thereof, projects into the path of rotation of said setting means (7) so as to be engaged by the latter (7) and release the lever member (13).

2. A device as claimed in claim 1, characterized by a hand-crank (1) for rotating said disk (3).

3. A device as claimed in claim 1, characterized in that the groove (4) of the disk (3) comprises a gripping sawtooth profile (5) in the advancement direction (27) for the wire (21) corresponding to the direction of rotation (2) of the disk (3).

4. A device as claimed in claim 1, characterized in that the wire guide means (19,20) is equipped with a ratchet brake (26,28,29) which only releases the wire in the advancement direction (27) and blocks it in the opposite direction.

5. A device as claimed in claim 1, characterized in that the mounting of the disk (3) or of the roller (11) on the lever member (13) is adjustable for the purpose of adapting its raised position to different wire thicknesses.

6. A device as claimed in claim 1, wherein said disk (3) is equipped with a curved scale (6) divided into the length units of the disk circumference, and said setting means (7) comprises an indicator/pointer (7) rotatably mounted on said disk (3) and designed to be secured in position on said disk (3) and thereby pointing at a division of said scale (6).

7. A device as claimed in claim 6, characterized in that the angle at the center of the curved scale (6) is larger than the angle corresponding to the portion of the rotation of the disk (3) in which the gear (17,18) is operated and that both angles together form a complete angle.

8. A device as claimed in claim 7, characterized in that the gear (17,18) is a cam gear, the drive member (18) of which is connected to the disk (3) and the power take-off member (17) of which is connected to the lever member (13).

9. A device as claimed in claim 8, characterized in that the cam (17) is formed on the edge of the lever member (13) facing towards the disk axis (3) and cooperates with a second roller (18) rotatably attached to the disk (3).

10. A device as claimed in claim 9, characterized in that the curved scale (6) and the indicator/pointer (7) are disposed on the upper side of the disk (3) and the second roller (18) on the underside of the disk (3).

11. A device as claimed in claim 1, wherein said disk (3) is equipped with a gripping circumferential groove (4) and said roller (11) is equipped with a circumferential groove (12) being disposed as a mirror image of the groove (4) of said disk (3).

12. A device as claimed in claim 1, wherein said cutting means (22,23) comprises a blade (22) mounted on the free end (15) of said lever member (13) and a counterblade (23) at the output of said wire guide means (19,20).

* * * * *